United States Patent Office 3,457,101
Patented July 22, 1969

3,457,101
THERMOSEALABLE POLYOLEFIN FILM
Franco Barbieri Hermitte and Mario Angeletti, Terni, Italy, assignors to Montecatini Edison S.p.A., Milan, Italy, a corporation of Italy
No Drawing. Filed Apr. 21, 1966, Ser. No. 544,069
Claims priority, application Italy, Apr. 27, 1965, 9,497/65
Int. Cl. B32b 27/08, 27/38
U.S. Cl. 117—76  5 Claims

ABSTRACT OF THE DISCLOSURE

Composite films which are readily thermosealable and exhibit high tensile strength, can be produced by coating a support layer of isotactic polypropylene with (1) a layer consisting of a partial reaction product of an amine with an epoxy compound and (2) a second layer consisting of a film of a vinyl or vinylidene homopolymer or copolymer.

---

The present invention relates to the preparation of films comprising alpha-olefin polymers, which films are easily thermosealable and/or impermeable to gases, vapors and the like. Such films are particularly useful for manufacturing containers, envelopes, small bags, vessels, and other manufactured articles useful in the packing industry.

Methods for preparing films from polymers of alpha olefins having a prevailingly isotactic structure, more particularly from polypropylene essentially consisting of macromolecules having isotactic structure and prepared with the aid of stereospecific catalysts, have been described in the art.

Due to their mechanical, protective and optical properties, crystalline polyolefin films, and particularly polypropylene films, are materials which are particularly suitable for use in the packaging field. However, these films, which are thermoplastic, cannot be readily used on most of the automatic or semiautomatic machines currently in use in the packaging industry today because these machines have been designed to accommodate the characteristics of the material most widely used for packing, namely the cellophane film. One of the chief differences between polyolefin films, more particularly polypropylene, and cellophane films, is that the polyolefin films are thermoplastic materials whereas cellophane is insensitive to heat until its combustion temperature is reached.

Cellophane is rendered suitable for sealing with automatic thermosealing devices on packaging machines by coating it with a thermoplastic varnish. Thus coated, the cellophane film is thermosealable and can be sealed without any difficulty, whereas the polyolefin films, and more particularly those of polypropylene, being thermoplastic throughout, melt upon contact with the sealing elements and tend to stick to them, thus causing breakage of the film. As a consequence, commercially feasible working speeds cannot be maintained with unmodified polyolefin films on such machines.

Various techniques for improving the characteristics of thermosealability, impermeability and the like, of films of synthetic polymers by coating the films with modifying materials have been proposed. One method of producing the coating is by extrusion of a lacquer of the coating material on the molten support film (extrusion coating); another method involves lamination of two films with each other, with or without adhesives; yet another method consists of spreading the coating agent dissolved in a suitable solvent onto the polymer film. An "anchorage" agent which facilitates the adhesion of the coating to the support is often added to the coating agent.

A pretreatment of the support film with chemical agents non-perforating continuous electric discharges, flame and the like is often substituted for or is used together with the "anchorage" agent.

In our previous application Ser. No. 439,921, filed Mar. 15, 1965, now abandoned, we describe a method for obtaining polyolefin films which are suitable for commercial use as thermosealable films, which method comprises coating a polyolefin support film with a multilayer coating comprising:

(a) A layer consisting of an amino compound, either polymeric or not;

(b) A layer capable of reacting with layer (a) and consisting of a mixture of an epoxy resin with a polymer or copolymer capable of rendering the support film thermosealable and/or impermeable to gases and vapors.

The first layer (a) preferably consists of alkyleneimine polymers, such as polyethyleneimines, polypropyleneimine, or simple amino compounds such as ethylene diamine, diethylene triamine, tetraethylene pentamine and the like. The second layer (b) preferably consists of a member selected from the group consisting of vinyl polymers, vinylidene polymers, vinyl copolymers, and vinylidene copolymers in admixture with an epoxy resin capable of reacting with the amino compound of the first layer.

We have now surprisingly found that commercially feasible thermosealable polyolefin films can be produced from unstretched polyolefin film or from such films which have been stretched in two directions, by covering them with a multilayer coating of:

(a) A primer layer made up of the compound obtained by partial reaction of an amine, whether or not polymeric in nature, with an oxirane derivative, whether polymeric or not;

(b) A layer, film or foil of a vinyl or vinylidene polymer or copolymer. Suitable polymeric materials include vinyl chloride polymers and vinyl acetate polymers as well as copolymers of vinyl chloride and vinyl acetate with each other or with acrylonitrile and vinylidene chloride. The preferred polymers include vinyl chloride/vinyl acetate, vinyl chloride/vinylidene chloride and vinylidene chloride/acrylonitrile copolymers, etc.

By "partial reaction" it is intended that the oxirane derivative is used in amounts lower than the stoichiometric; more specifically the amine/oxirane compound molar ratios are between 1:0.01 and 1:0.99, preferably between 1:0.05 and 1:0.5.

The first layer (a) preferably is the reaction product of oxirane derivatives with alkylenimine polymers such as polyethylenimine, polypropylenimine and the like, or with simple amino compounds such as ethylenediamine, diethylene triamine, tetraethylene pentamine and the like.

The oxirane compound can be a polymeric reaction product of epichlorohydrin with bisphenols (for example the commercial products sold under the trade name Epikote-Bisphenol A, di-[p-hydroxyphenyl] dimethyl methane, is a particularly preferred bisphenol), or a glycidyl derivative such as the digylcidyl ether of diethyleneglycol, N,N'-diglycidylpiperazine and the like.

The layer (a), may be prepared by mixing diluted aqueous solutions of the amino compound with diluted aqueous solutions or dispersions of the oxirane compound at room temperature. The aqueous solutions thus obtained have good stability.

The coating of layer (a) may be applied to unstretched polyolefin film or the film may have been stretched in one or two directions. The film may have been electrically treated or not. Further, the stretching or stretching may be carried out after the application of the coating. The coating may be applied to one or both sides of the polyolefin film.

The electrical treatment of the films is carried out by subjecting it to a non-disrupting electric discharge, preferably using discharging devices which are fed with an alternating tension of 200–500 volts and 50–60 Hz. and produce in a discharging space where the film is passed, e.g., between an output electrode and a heated roller (driving the film), a tension of 3,000–10,000 volts at a frequency of 8,000–16,000 Hz. which is capable of generating a sufficient amount of ozone to modify the film surface and render same receptive to inks, adhesives, etc. Devices of this type may be of the SCAE type, particularly the apparatus having a power of 6 kw. fed with a tension of 500 v. at 50 Hz. and giving a discharging current of 0.1 ampere, or of the Lepel Inc. type (particularly the Model HFSG/6).

The coating of layer (B) may be applied onto one or both sides of the film by known methods. These including spreading aqueous or organic solutions or dispersions of material (b) over the film and by immersion of the film in said solutions or dispersions followed by evaporation of the solvent. The total thickness of the coating can vary from 1 to $20\mu$. The degree of adhesion of the coating to the support film is measured by placing a piece of adhesive cellulose tape under pressure onto the surface of the coated film and then immediately stripping the same cellulose tape from the said surface. Coatings with good or excellent adhesion will remain firmly attached to the support film whereas coatings with poor adhesion will be partially or completely removed from the support film. The degree of adhesion is also measured by the peeling test method which involves evaluating, by means of a dynamometer, the tensile strength of the adhesion. The values of peeling test are considered good if they exceed 80–100 g./cm. It should, however, be observed that the desired values of sealing strength depend upon the type of application for which the coated film is intended to be used. Thus 80–100 g./cm. is considered excellent for such ultimate applications as, e.g. cigarette packages. On the other hand, if the coated film is to be used as a container for rice, sugar and the like, higher sealing strengths are required.

The supports onto which the primer and the coatings according to the present invention are applied are films obtained from olefin polymers, preferably propylene polymers, prepared with stereospecific catalysts.

Stabilizers, lubricants, plasticizers, dyeing pigments, antistatic agents, fillers and the like can be included in one or more of the layer of the composite film.

The composite films of the invention show substantial improvements and advantages as compared to those of the prior art. In particular, the tensile strength of adhesion is higher than 200 g./cm.

The following examples will serve to further illustrate the invention without limiting its scope.

Example 1

A $20\mu$ film stretched in two directions of polypropylene consisting essentially of isotactic macromolecules having an intrinsic viscosity $[\eta]$ of 2 (determined in tetrahydronaphthalene at 135° C.), was subjected to electronic treatment with a device of the SCAE type (6 kw., fed with a tension of 500 v. at 50 Hz. and giving a discharging current of 0.1 ampere), and was then coated on one side (by means of a spreading device of the type gravure roll—see Encyclopedia of Polymer Science and Technology, vol. 3, page 776, 1965, John Wiley & Sons Inc., N.Y.) with a 1% solution of the reaction product of 10 mols of polyethylenimine and 1 mole of the diglycidyl ether of ethyleneglycol in a mixture of 2 parts water to 1 part isopropyl alcohol, all parts being by weight. The film was then dried in an oven and coated with a layer consisting of a vinyl chloride/vinyl acetate (85–15) copolymer with a Fikentscher value $K=32$, from a 20% solution of the copolymer in methylethylketone.

A $22\mu$ composite film was obtained consisting of: (1) a first layer of vinylchloride/vinyl acetate (85–15) copolymer, (2) a second layer consisting of the polyimine/epoxy compound reaction product and (3) the polypropylene film.

The composite film obtained had the following characteristics:

Thickness of the coating _____ $2\mu$
Adhesion (Scotch-tape test) _____ Good
Blocking at 43° C. _____ Absent
Transparency _____ Good
Slip _____ Good
Sealing strength (peeling test) at 120° C. __g./cm__ 300

Comparative experiment

On the polypropylene film which has undergone the electronic treatment, a first coating with 1% water solution of polyethyleneimine was applied (in absence therein of the epoxy resin) and then after drying in an oven a second layer was applied consisting of a mixture of diglycidyl ether of ethyleneglycol with the vinyl chloride/vinyl acetate (85–15) copolymer; the characteristics were:

Sealing strength (peeling test) at 120° C. __g./cm__ 80

Example 2

Using the procedure described in Example 1, but substituting for the vinylchloride/vinyl acetate copolymer layer a layer consisting of 95 parts by weight of vinylidene chloride/acrylonitrile (80–20) copolymer+5 parts by weight of Epikote 1001, there was obtained a composite film consisting of the following layers: (1) A layer of vinylidene chloride/acrylonitrile (80–20) copolymer+Epikote 1001, (2) a layer of the polyimine/epoxy compound mixture reaction product and (3) the polypropylene film.

The characteristics of the composite film were as follows:

Thickness of the coating _____ $2\mu$
Adhesion (Scotch-tape test) _____ Good
Blocking at 43° C. _____ Absent
Transparency _____ Good
Slip _____ Good
Sealing strength (peeling test) at 130° C. __g./cm__ 250

Comparative experiment

By operating as in Example 2, with the exception that the first coating consists only of polyethyleneimine rather than the polyethyleneimine/epoxy compound mixture reaction product, a composite film was obtained having the following characteristics:

Sealing strength (peeling test) at 120° C. __g./cm__ 150

Various modifications and changes can of course be made without departing from the spirit and scope of the invention.

Having thus described our invention, what we desire to secure by Letters Patent and hereby claim is:

1. A composite film which is easily thermosealable and exhibits a tensile strength of adhesion between the layers thereof higher than 200 g./cm., said film comprising a support layer film of polypropylene consisting essentially of isotactic macromolecules, said support layer having coated thereon (1) a primer layer consisting of a partial reaction product of an amine selected from the group consisting of an alkyleneimine polymer, ethylenediamine, diethylenetriamine or tetraethylenepentamine with an epoxy compound, said amine and said epoxy compound having been reacted in a molar ratio between 1:0.01 and 1:0.99, and (2) a further layer consisting of a film of a vinyl or vinylidene polymer or copolymer superimposed on said primer layer.

2. The film of claim 1 wherein said epoxy compound is selected from the group consisting of epichlorohydrin/bisphenol A resins, the diglycidyl ether of ethyleneglycol and N,N'-diglycidylpiperazine.

3. The film of claim 1 wherein the alkylenimine polymer is polyethylenimine or polypropylenimine.

4. The film of claim 1 wherein at least one stabilizer, lubricant, dyestuff or antistatic agent is included in a layer thereof.

5. The film of claim 1 wherein the amine/epoxy compound molar ratio is between 1:0.05 and 1:0.5.

References Cited
UNITED STATES PATENTS

| | | |
|---|---|---|
| 2,981,701 | 4/1961 | St. Clair et al. |
| 3,033,707 | 5/1962 | Lacy et al. |
| 3,250,639 | 5/1966 | Stead. |
| 3,285,766 | 11/1966 | Barkis et al. |

WILLIAM D. MARTIN, Primary Examiner

R. HUSACK, Assistant Examiner

U.S. Cl. X.R.

117—7, 47, 68, 122, 138.8